(12) United States Patent
Reza et al.

(10) Patent No.: US 8,265,039 B2
(45) Date of Patent: Sep. 11, 2012

(54) APPARATUS AND METHOD FOR IMPROVED IDLE STATE HANDOFF

(75) Inventors: Ashrafur Md. Reza, San Diego, CA (US); Qingxin Chen, Del Mar, CA (US); Reza Shahidi, San Diego, CA (US); Rajeev Subhash Kurundkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 768 days.

(21) Appl. No.: 12/479,217

(22) Filed: Jun. 5, 2009

(65) Prior Publication Data
US 2010/0311420 A1 Dec. 9, 2010

(51) Int. Cl.
*H04W 36/00* (2009.01)
(52) U.S. Cl. .................................. 370/332; 455/437
(58) Field of Classification Search .................. None
See application file for complete search history.

(56) References Cited

U.S. PATENT DOCUMENTS

| | | | | |
|---|---|---|---|---|
| 5,428,816 | A * | 6/1995 | Barnett et al. | 455/437 |
| 6,195,551 | B1 * | 2/2001 | Kim et al. | 455/436 |
| 7,894,816 | B1 * | 2/2011 | Chalishazar et al. | 455/439 |
| 2002/0049058 | A1 | 4/2002 | Tee | |
| 2006/0014551 | A1 * | 1/2006 | Yoon et al. | 455/458 |
| 2006/0215609 | A1 * | 9/2006 | Kyung et al. | 370/331 |
| 2006/0291427 | A1 * | 12/2006 | Park | 370/332 |
| 2010/0027510 | A1 * | 2/2010 | Balasubramanian et al. | 370/332 |

FOREIGN PATENT DOCUMENTS

| | | |
|---|---|---|
| EP | 1487230 | 9/2010 |
| WO | WO2005041612 | 5/2005 |

OTHER PUBLICATIONS

International Search Report and Written Opinion—PCT/US2010/037599, International Search Authority—European Patent Office—Sep. 10, 2010.

* cited by examiner

*Primary Examiner* — Min Jung
(74) *Attorney, Agent, or Firm* — Darren M. Simon

(57) ABSTRACT

A method and apparatus for facilitating handoff operations in a wireless communication device is provided. The method may comprise receiving, by a wireless communication device, a plurality of pilot signals, wherein the plurality of pilot signals includes an active pilot signal and one or more candidate pilot signals, selecting at least one nominal active pilot signal strength value for comparison with the active pilot signal, classifying the one or more candidate pilot signals into a respective one of a plurality of tiers based on a handoff factor corresponding to the at least one candidate pilot signal, wherein the plurality of tiers are divided according to one or more handoff factors, and selecting at least one threshold handoff value for each of the plurality of tiers, wherein the at least one threshold handoff value partly depends on one of the at least one nominal active pilot signal strength values.

33 Claims, 7 Drawing Sheets

APPARATUS AND METHOD FOR IMPROVED IDLE STATE HANDOFF

BACKGROUND

1. Field

The present application relates generally to wireless communications, and more specifically to methods and systems for facilitating handoff operations in a wireless communication device

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A wireless communication device (WCD) can receive communication signals from a plurality of geographically distributed base stations. The WCD may exchange signals, referred to as traffic channel signals, with the base stations and/or satellites when engaged in a call, maintaining a communication link. While engaged in a call, the WCD can handoff between different base stations using known techniques, thereby maintaining seamless call coverage as the WCD moves relative to the base stations and/or satellite beams.

Push-to-talk (PTT) WCDs, such as PTT-equipped cellular telephones have gained widespread use amongst various public service groups, such as police departments, fire departments, paramedics and military branches. The group communication option prevalent in such systems allows for any and all of the members of such groups to stay in contact during emergency type situations.

When the WCD is not engaged in a call or an active communication link, the WCD can operate in an idle state or mode to conserve resources. During operation in idle state, the WCD may monitor signals from base stations to determine if a handoff may be needed. Currently, a WCD may be required to assure that overhead information for a prospective base station is up-to-date prior to initiating a handoff to the prospective base station. Repetitiously obtaining this overhead information can reduce efficiency, especially with respect to PTT services. Additionally, excessive handoff between base stations due to ineffective handoff criteria may reduce efficiency and/or waste energy. Thus, there exists a need to effectively facilitate handoff of a WCD between base stations, specifically during idle state operations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating handoff operations in a wireless communication device. According to one aspect, a method for facilitating handoff operations in a wireless communication device is provided. The method can comprise receiving, by a wireless communication device, a plurality of pilot signals, wherein the plurality of pilot signals includes an active pilot signal and one or more candidate pilot signals, selecting at least one nominal active pilot signal strength value for comparison with the active pilot signal, classifying the one or more candidate pilot signals into a respective one of a plurality of tiers based on a handoff factor corresponding to the at least one candidate pilot signal, wherein the plurality of tiers are divided according to one or more handoff factors, and selecting at least one threshold handoff value for each of the plurality of tiers, wherein the at least one threshold handoff value partly depends on one of the at least one nominal active pilot signal strength values.

Yet another aspect relates to at least one processor configured to facilitate handoff operations in a wireless communication device. The at least one processor can a first module for receiving, by a wireless communication device, a plurality of pilot signals, wherein the plurality of pilot signals includes an active pilot signal and one or more candidate pilot signals, a second module for selecting at least one nominal active pilot signal strength value for comparison with the active pilot signal, a third module for classifying the one or more candidate pilot signals into a respective one of a plurality of tiers based on a handoff factor corresponding to the at least one candidate pilot signal, wherein the plurality of tiers are divided according to one or more handoff factors, and a fourth module for selecting at least one threshold handoff value for each of the plurality of tiers, wherein the at least one threshold handoff value partly depends on one of the at least one nominal active pilot signal strength values.

Still another aspect relates to a computer program product comprising a computer-readable medium. The computer-readable medium can include a first set of codes for causing a computer to receive, by a wireless communication device, a plurality of pilot signals, wherein the plurality of pilot signals includes an active pilot signal and one or more candidate pilot signals, a second set of codes for causing the computer to select at least one nominal active pilot signal strength value for comparison with the active pilot signal, a third set of codes for causing the computer to classify the one or more candidate pilot signals into a respective one of a plurality of tiers based on a handoff factor corresponding to the at least one candidate pilot signal, wherein the plurality of tiers are divided according to one or more handoff factors, and a fourth set of codes for causing the computer to select at least one threshold handoff value for each of the plurality of tiers, wherein the at least one threshold handoff value partly depends on one of the at least one nominal active pilot signal strength values.

Yet another aspect relates to an apparatus. The apparatus can include means for receiving, by a wireless communication device, a plurality of pilot signals, wherein the plurality of pilot signals includes an active pilot signal and one or more candidate pilot signals, means for selecting at least one nominal active pilot signal strength value for comparison with the active pilot signal, means for classifying the one or more candidate pilot signals into a respective one of a plurality of tiers based on a handoff factor corresponding to the at least one candidate pilot signal, wherein the plurality of tiers are divided according to one or more handoff factors, and means for selecting at least one threshold handoff value for each of the plurality of tiers, wherein the at least one threshold handoff value partly depends on one of the at least one nominal active pilot signal strength values.

Another aspect relates to an apparatus. The apparatus can include a receiver operable for receiving, by a wireless communication device, a plurality of pilot signals, wherein the plurality of pilot signals includes an active pilot signal and one or more candidate pilot signals, a cell reselection module operable for: selecting at least one nominal active pilot signal strength value for comparison with the active pilot signal, classifying the one or more candidate pilot signals into a respective one of a plurality of tiers based on a handoff factor corresponding to the at least one candidate pilot signal, wherein the plurality of tiers are divided according to one or more handoff factors, and selecting at least one threshold handoff value for each of the plurality of tiers, wherein the at least one threshold handoff value partly depends on one of the at least one nominal active pilot signal strength values.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, to facilitate efficient handoff operations, a tiered handoff threshold structure is presented. In such a tiered handoff threshold structure, preference may be given to candidate base stations that possess preferred qualities. In one aspect, preference may be given to base stations of which overhead information is known. In another aspect, preference may be given to base stations residing in the same subnet as the active base station. Use of such preferences within a tiered handoff threshold structure may reduce excessive handoff between base stations. Thus, through application of a tiered handoff threshold structure a WCD may effectively facilitate handoff between base stations, specifically during idle state operations.

Additionally, a WCD may perform multiple types of handoffs. For example, a WCD may perform: a reacquisition handoff (RAHO), an access entry handoff (AEHO), an access handoff (AHO), an idle monitor handoff (IHO), a color code change (e.g. signal/noise handoff: SNHO), etc. Such handoffs may occur within the same subnet as an active signal or across subnet boundaries. Furthermore, generally, an AT is required to ensure that overhead information is current upon switching to a new sector prior to accessing the new sector network.

Generally, a PTT service may include initiating access to the network, setting up a session (e.g. probe start) and accessing the session. Excess and/or needless handoffs may result in delays in during any of these steps. For example, an AT may go into an IHO, RAHO, SNHO, etc. mode shortly after a PTT session is initiated. In another example, an AT may go into an AEHO, RAHO, etc. mode during call setup (e.g. at the originating AT and/or target AT(s)). In still another example, an AT may go into an AHO between access probes, thereby causing delays.

Figure 1:
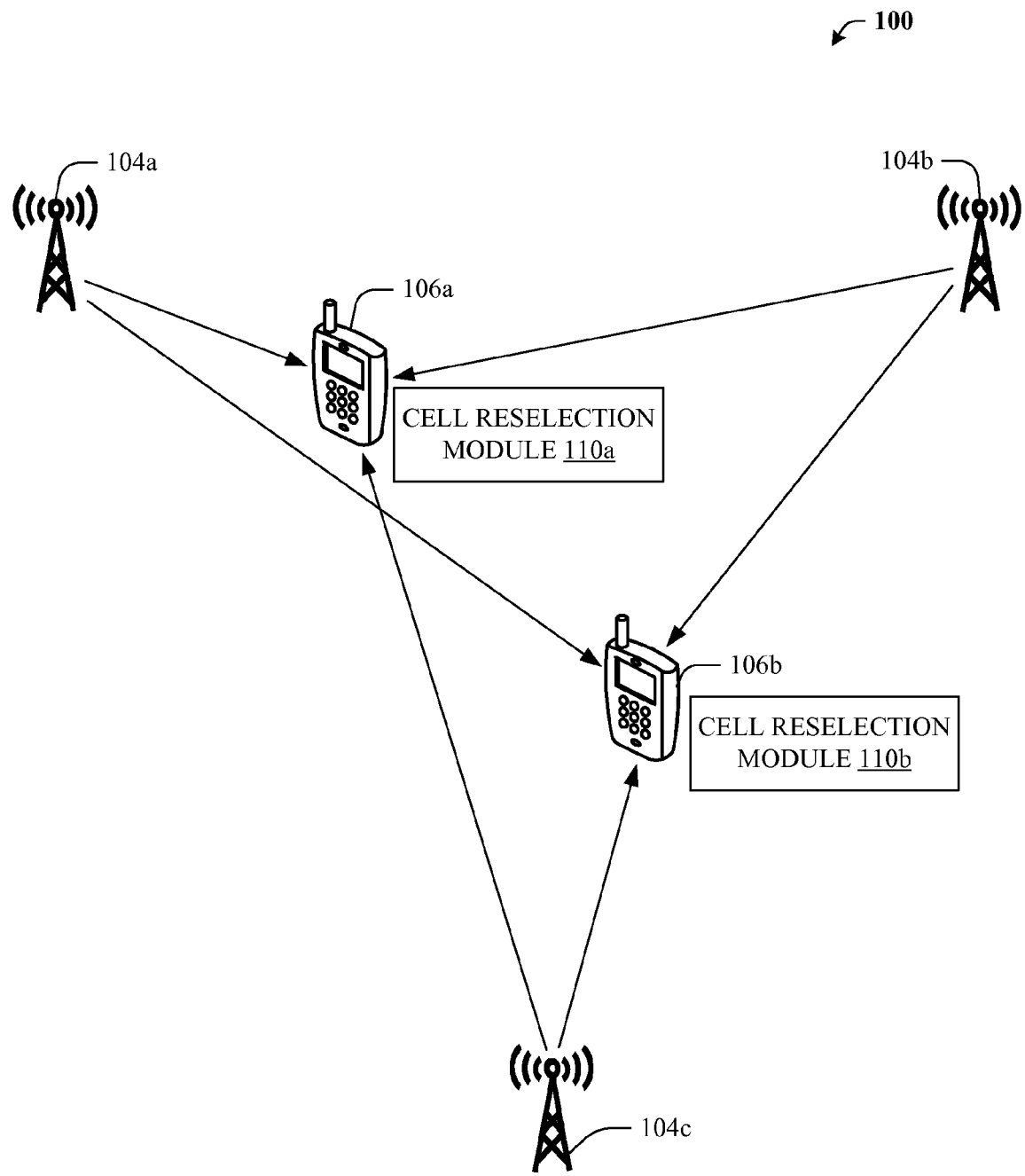
FIG. 1 illustrates a block diagram of an exemplary communication system that can facilitate handoff operations in a wireless communication device.

With reference now to FIG. 1, exemplary system 100 that can facilitate handoff operations in a wireless communication device is depicted. Generally, system 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two wireless communication devices 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term wireless communication device can be used interchangeably with the terms user equipment (UE), mobile station, subscriber station, access terminal, remote terminal, or other corresponding terms known in the art. The term mobile station encompasses fixed wireless applications.

Depending on the system being implemented, each wireless communication device 106 may communicate with one (or possibly more) base stations 104 on the forward link at any given moment, and may communicate with one or more base stations on the reverse link depending on whether or not the wireless communication device is in soft handoff. The forward link (i.e., downlink) refers to transmission from the base station to the wireless communication device, and the reverse link (i.e., uplink) refers to transmission from the wireless communication device to the base station. Further, depending on factors such as received signal strength and the like, a wireless communication device 106 may switch which base station 104 the wireless communication device 106 actively is interacting with during a handoff procedure. A handoff may occur when a wireless communication device 106 is actively interacting with base stations 104 or during an idle mode.

Wireless communication devices 106 may switch to an idle more (or idle state) when not actively engaging in communication with a base station 104. In idle mode, a wireless communication device 106 is not actively transmitting or receiving voice or data, but is periodically monitoring the system. The periodic monitoring is further discussed with reference to FIG. 2. In one aspect, wireless communication device 106 may include a cell reselection module 110 to assist in facilitating idle mode handoffs. The cell reselection module is further discussed with reference to FIG. 3.

Figure 2:
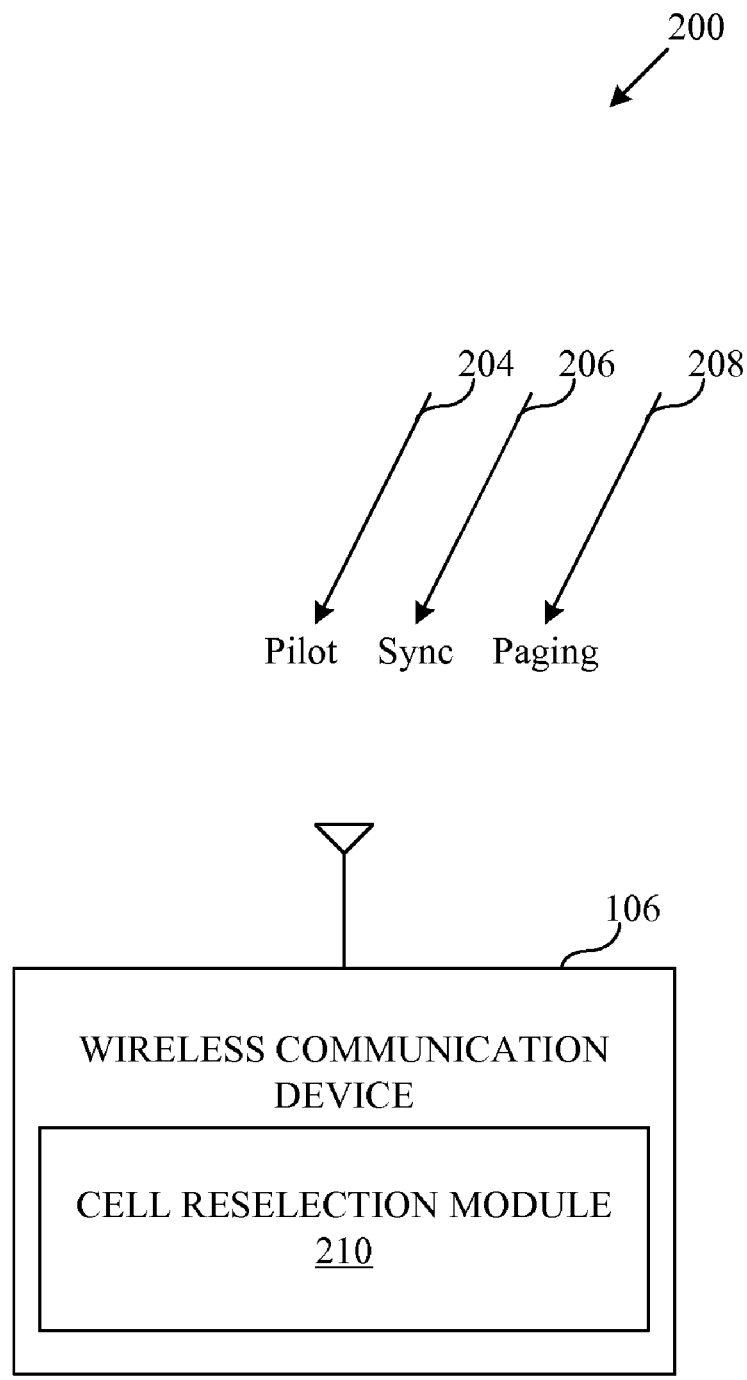
FIG. 2 illustrates an exemplary set of forward link signals delivered to a wireless communication device of FIG. 1.

With reference now to FIG. 2, an illustration of an exemplary set of forward link signals 200 delivered to WCD 106 is depicted. Forward link signals 200 may be transmitted from a base station (for example, base station 104). Forward link signals 200 include one or more of the following signals: pilot signal 204; synchronization (sync) signal 206 associated with the pilot signal; and paging signal 208 associated with the pilot signal. The forward link may also include additional signals, such as traffic signals, that do not form a part of the depicted aspect, and are, therefore, not discussed further. Pilot signal 204, sync signal 206, paging signal 208, and the traffic signals are also referred to in the art as pilot channel signal 204, sync channel signal 206, paging channel signal 208, and traffic channel signals, respectively.

Each base station may transmit a respective pilot signal (for example, pilot signal 204). The pilot signal is used by the wireless communication device (for example, WCD 106) to acquire initial system synchronization and to provide robust time, frequency, and phase tracking of the other forward link signals transmitted by the base station. The pilot signal transmitted by each base station may use a common spreading code, such as a PN sequence, but a different code phase offset (for example, a different time offset), thereby enabling a WCD to distinguish between the pilot signals transmitted from respective base stations. In one aspect, a pilot signal received from a base station currently selected by the WCD may be retained in an active set (asset). Further, one or more pilot signals received from one or more base station not currently selected by the WCD may be retained in a candidate set (cset). Still further, pilot signal information from nearby base stations may be transmitted to the WCD through the paging signal and may be retained in a neighbor set (nset). In one aspect, multiple base stations may operate in such a manner as to act as a network, subnet, etc., such that WCD communications within the network, subnet, etc., may be preferable to WCD communications with a base station outside the network, subnet, etc. In one aspect, for example, an access terminal (AT) (e.g. a WCD) may obtain a Unicast Access Terminal Identifier (UATI) to identify the AT to an access network (AN) (e.g. a base station). The UATI may be represented by a UATISubnetMask and a sectorID. In such an aspect, a UATI may include a 128 bit string in which a subnet mark is represented by a 104 bit string and a sectorID24 by a 24 bit string. Furthermore, an AT UATI may be stored and/or registered along with other AT UATIs with a radio network controller (RNC). Furthermore, in such an aspect, various ANs with access to the AT UATI through the RNC may be said to be within the same subnet. Conversely, an AN with no record of or access to an AT UATI may be said to not be within the same subnet as the AT and, in such a case, a UATI must be established with such an AN prior to establishing communications between the AT and the AN. In one aspect, WCD 106 may include a cell reselection module 210 to assist in performing handoffs between base stations. Further, possible base stations to which a handoff may occur may be defined by pilot signals referenced to in a cset and/or a nset. Still further, in such an aspect, reselection module 210 may further include an adaptive filter to substantially remove short term pilot signal variations. Cell reselection module 210 is further discussed with reference to FIG. 3.

Sync signal 206 is a modulated spread spectrum signal, including system timing messages used by WCD 106 to acquire an overall communication system time associated with communication system 100. Sync signal 206 is spread using a code, such as PN code, that is related to the code used to spread associated pilot signal 204. Once pilot signal 206 has been acquired by WCD 106, the WCD acquires sync signal 206, thereby permitting the WCD to synchronize timing internal to the WCD with the overall system time. Alternatively, a timing difference can be stored and used to correct subsequent processing, such as coding, or signal transmission timing.

Paging signal 208 is a modulated spread spectrum signal used to deliver messages to WCDs. Paging signal 208 is spread using a code, such as a PN code, that is related to the code used to spread associated pilot signal 204. One or more codes (for example, a set of codes) may be typically used to spread and/or channelize each of these signals, and the set of codes associated with each signal also may be used to synchronize with, de-spread, and de-channelize that signal. Once WCD 106 is synchronized with system time, it can monitor paging signal 208. Communication system 100 and WCD 106 can operate in a slotted paging mode using paging signal 208. Paging signal 208 may additionally provide overhead information relating to neighboring (e.g. candidate) base station signals. This overhead information may be cached in the WCD and may include parameters provided through overhead messages such as, for example, a sector parameter message, an access parameter message and quick configuration message. In one aspect, a sector parameters message may be used to convey sector specific information to an AT. These sector parameters may include fields, such as an overhead signature field. An AN may change this field if the content of a sector parameters message changes. Access parameters may include reverse power control parameters, access parameters, and access channel parameters. A quick configuration message may be used to indicate a change in overhead message content and other frequently changing information. A quick configuration message may include fields, such as an overhead signature field. An AN may set this field to the value of the overhead signature field of the next sector parameter message it will transmit.

Figure 3:
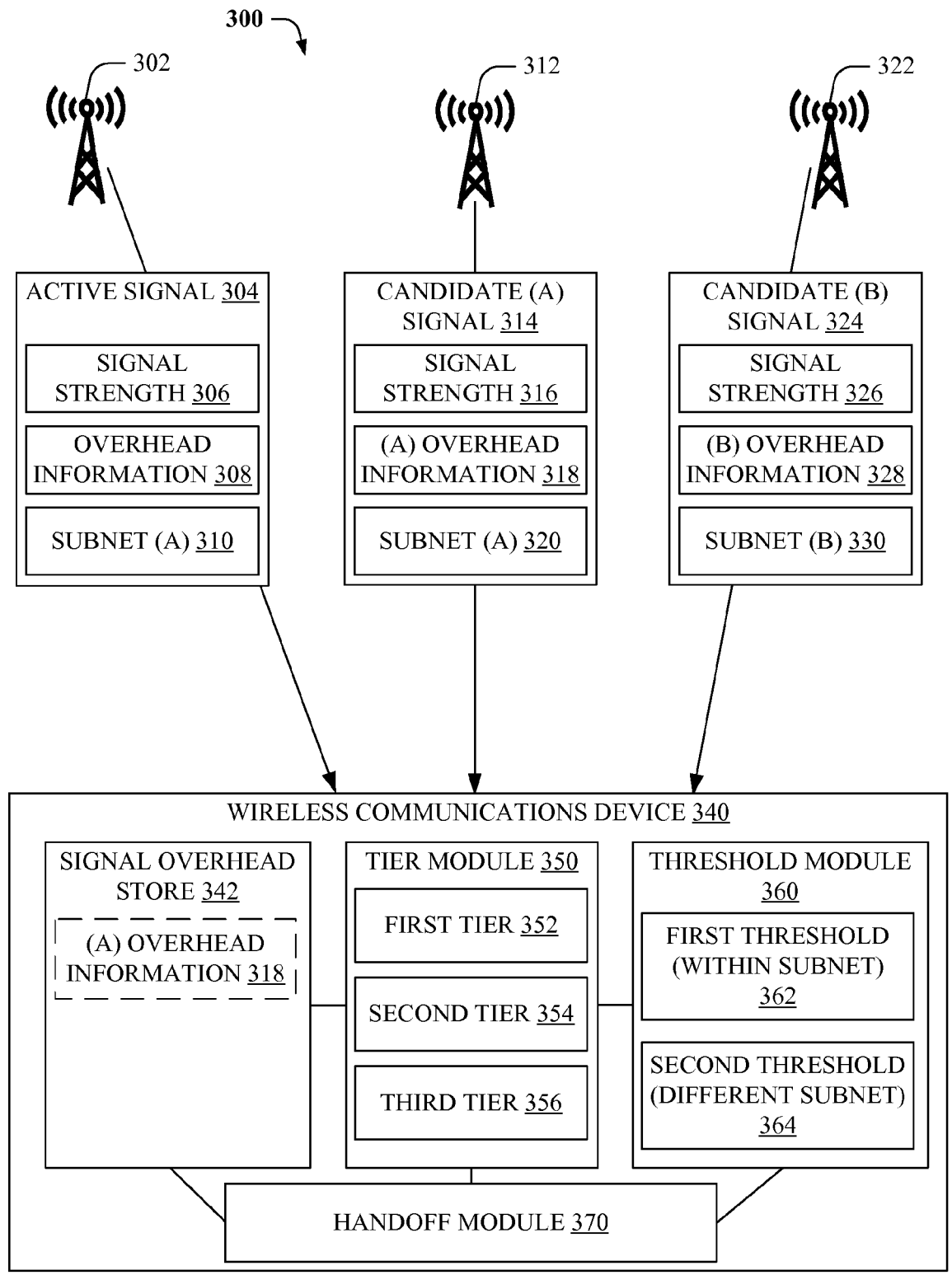
FIG. 3 illustrates a block diagram of an exemplary wireless communication.

With reference now to FIG. 3, an illustration of a wireless system 300 according to an aspect is presented. The system 300 includes a plurality of base stations (302, 312, 322) and a wireless communication device (WCD) 340 that configurable to facilitate handoff operations. In the aspect depicted in FIG. 3, base station 302 is actively is interacting with wireless communications device 340 have an established communication session. As such, base station 302 may transmit active signal 304. Active signal 304 may comprise information relating to the signal strength 306, overhead information 308, and subnet information 310. In the depicted aspect, the active signal 304 is associated with a first subnet (e.g. subnet A). Furthermore, system 300 may include one or more candidate base stations (312, 322) that are within the vicinity of WCD 340. Each of these candidate base stations (312, 322) may transmit a candidate signal (314, 324). As with the active signal 304, each candidate signal (314, 324) may comprise information relating to the signal strength (316, 326), overhead information (318, 328), and subnet information (316, 328). In the depicted aspect, the candidate signal 314 is associated with the same subnet (e.g. subnet A) as the WCD 340, while candidate signal 316 is associated with a different subnet (e.g. subnet B) than the WCD 340.

WCD 340 may include signal overhead store 342, tier module 350, threshold module 360, and handoff module 370. In the depicted aspect, signal overhead store 342 has stored overhead information 318 corresponding to base station 312. For example, such information may be been obtained through a previous communication session, etc. In one aspect, signal overhead store 342 has finite storage capacity and may remove unused, outdated, and/or redundant stored overhead information. In such an aspect, a determination as to which overhead information items may be removed may be based at least in part on a time stamp associated with any stored overhead information. Accordingly, where signal overhead store 342 is unable to accept additional overhead information, stored overhead information items with older time stamps may be removed. In another aspect, older stored overhead information items that are not associated with a neighbor set for a currently serving cell may be removed. In yet another aspect, a user, service provider, etc., may select to remove any or all stored overhead information. In one aspect, tier module 350 may include one or more tiers, such as first tier 352, second tier 354, and third tier 356. In such an aspect, the three tiers may be used to indicate preferences among candidate signals. For example, first tier 352 classification may correspond to candidate signals with known overhead information, and that reside within the same subnet as the active signal 304. Further, for example, second tier 354 classification may correspond to candidate signals with unknown overhead information, but that reside within the same subnet as the active signal 304. Still further, third tier 356 classification may correspond to candidate signals that reside in a different subnet than the active signal 304.

In one aspect, threshold module 360 includes a plurality of possible thresholds to be applied in determining whether to activate a handoff module 370. In the depicted aspect, threshold module includes first threshold 362 and second threshold 364. Further, as depicted, first threshold 362 is determined to be a relatively lower threshold value for candidate signals within the same subnet as compared to the active signal 304 and may be applied to candidate signals classified through the tier module 350. Still further, as depicted, second threshold 364 is determined to be a relatively higher threshold value for candidate signals within a different subnet as compared to the active signal 304 and may be applied to candidate signals classified through the tier module 350.

In operation, application of tier module 350 and threshold module 360 to determine whether to proceed with a handoff, through handoff module 370, allows the WCD to reduce excessive handoff between base stations, thereby reducing power consumption, etc.

Figure 4:
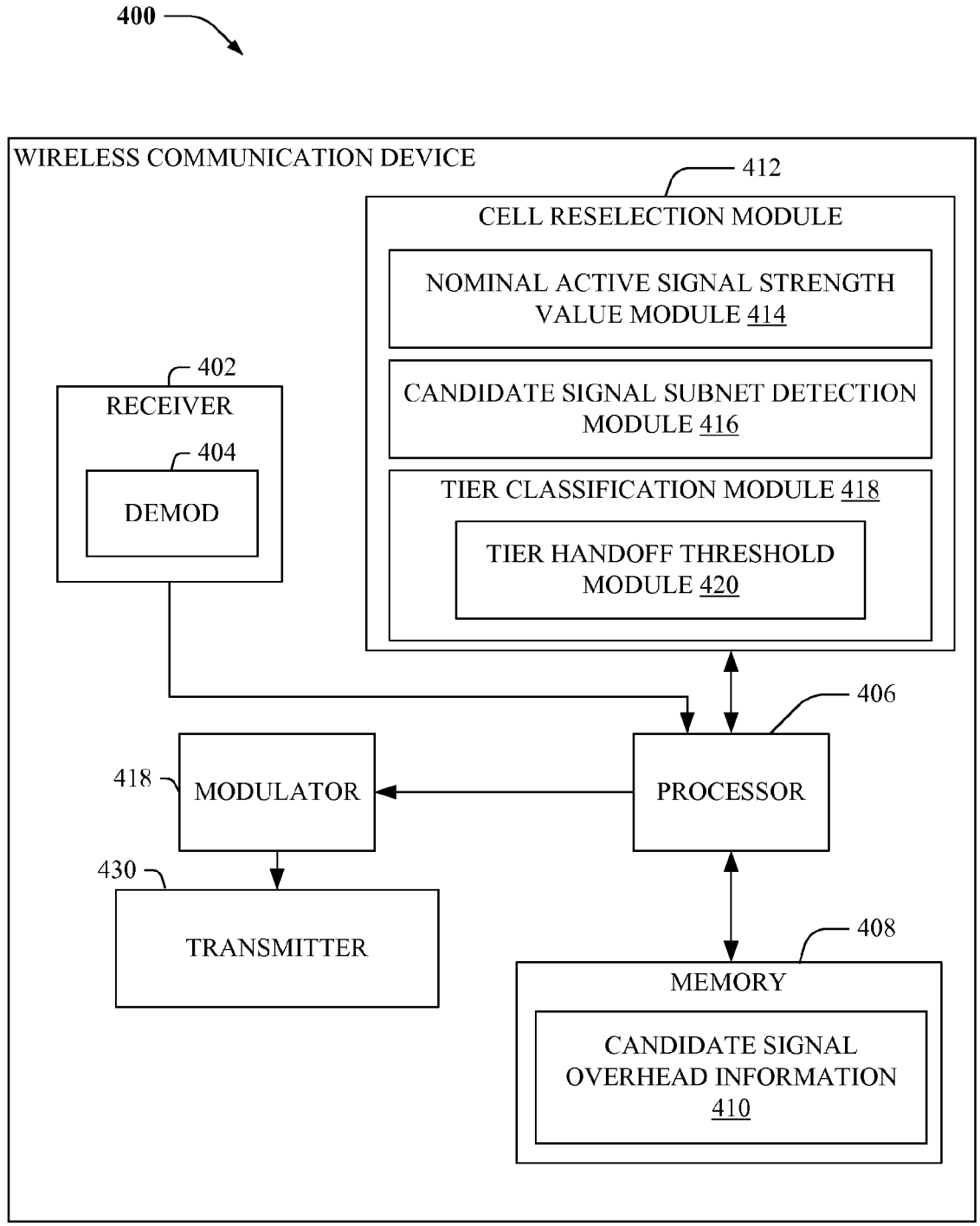
FIG. 4 illustrates a block diagram example architecture of a Wireless communication device.

With reference now to FIG. 4, an illustration of a wireless communication device 400 that facilitates handoff operations is presented. Client device 400 comprises a receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to a processor 406 for channel estimation. Processor 406 can be a processor dedicated to analyzing information received by receiver 402 and/or generating information for transmission by a transmitter 420, a processor that controls one or more components of client device 400, and/or a processor that both analyzes information received by receiver 402, generates information for transmission by transmitter 430, and controls one or more components of client device 400.

Client device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.).

In one aspect, memory can include candidate signal overhead information 410. Candidate signal overhead information 410 may include information relating to neighboring (e.g. candidate) base station signals, such as respective frequencies, sector specific information, signature fields, reverse power control parameters, access parameters, access channel parameters, etc.

It will be appreciated that the data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 of the subject systems and methods is intended to comprise, without being limited to, these and any other suitable types of memory.

Client device 400 can further comprise a cell reselection module 412 to facilitate handoff operations in a wireless communication device. Cell reselection module 412 may include nominal active signal strength value module 414 to assist in facilitating effective handoff. In one aspect, a nominal active pilot signal strength value may include a first value to use with a candidate pilot signal associated with a base station within the same subnet as the active pilot signal and a second value to use with a candidate pilot signal associated with a base station not within the same subnet as the active pilot signal. In such an aspect, the nominal active pilot signal strength value selected for a pilot signal not associated with a base station within the same subnet is higher than a nominal active pilot signal strength value for a pilot signal associated with a base station within the same subnet.

Cell reselection module 412 may also include candidate signal subnet detection module 416. In one aspect, signal subnet detection module 416 detects which candidate pilot signals are associated with base stations within the same subnet as the base station corresponding to the active pilot signal.

Further, cell reselection module 412 may include tier classification module 418 to organize possible preferences for handoff between various available candidate pilot signals. In one aspect, tier classification module 418 is organized to have three tiers, with a first tier representing candidate pilot signals that have overhead information associated with the candidate pilot signal stored with the wireless device and the same subnet as the active pilot signal, a second tier representing candidate pilot signals that do not have overhead information associated with the candidate pilot signal stored with the wireless device but are part of the same subnet as the active pilot signal, and a third tier representing candidate pilot signals that are not part of the same subnet as the active pilot signal.

In one aspect, in operation, if more than one candidate from the multiple tiers has a pilot signal strength that exceeds the corresponding threshold handoff value, then cell reselection module 412 may first determine whether the respective candidate pilot signals are within the same subnet as the active pilot signal. In one aspect, if the respective candidate pilot signals are within a different subnet than the active pilot signal, then cell reselection module 412 may select the candidate pilot signal having the greatest signal strength. In another aspect, if the respective candidate pilot signals are within a different subnet than the active pilot signal, then cell reselection module 412 may select the candidate pilot signal with the greatest signal strength.

In one aspect, tier classification module 420 may include tier handoff threshold module 420 to provide possible threshold values for handoff and corresponding to various tiers organized within the tier classification module 418. Furthermore, each tier may have at least one corresponding threshold value. In one aspect, the multiple threshold values for each tier may correspond to a relationship between the active signal strength and a nominal signal strength. As such, if the active signal strength is greater than or equal to the nominal signal strength then a higher threshold may be used than would be used if the active signal strength was less than the nominal signal strength. In one aspect, the at least one thresholds for each tier is selected such that the at least one threshold handoff value for the first tier is a smaller value than the at least one threshold handoff value for the second tier and the at least one threshold handoff value for the second tier is a smaller value than the at least one threshold handoff value for the third tier. In such an aspect, a handoff procedure may be initiated more easily when a smaller threshold value is used. Accordingly, for example, such thresholds may be set so as to, make it easier to perform a handoff to a candidate sector for which the WCD has overhead information and is within the same subnet, more difficult to perform a handoff to a candidate sector for which the WCD has no overhead information but that is still within the same subnet, and even more difficult to perform a handoff to a candidate sector outside of the active subnet.

Figure 5:
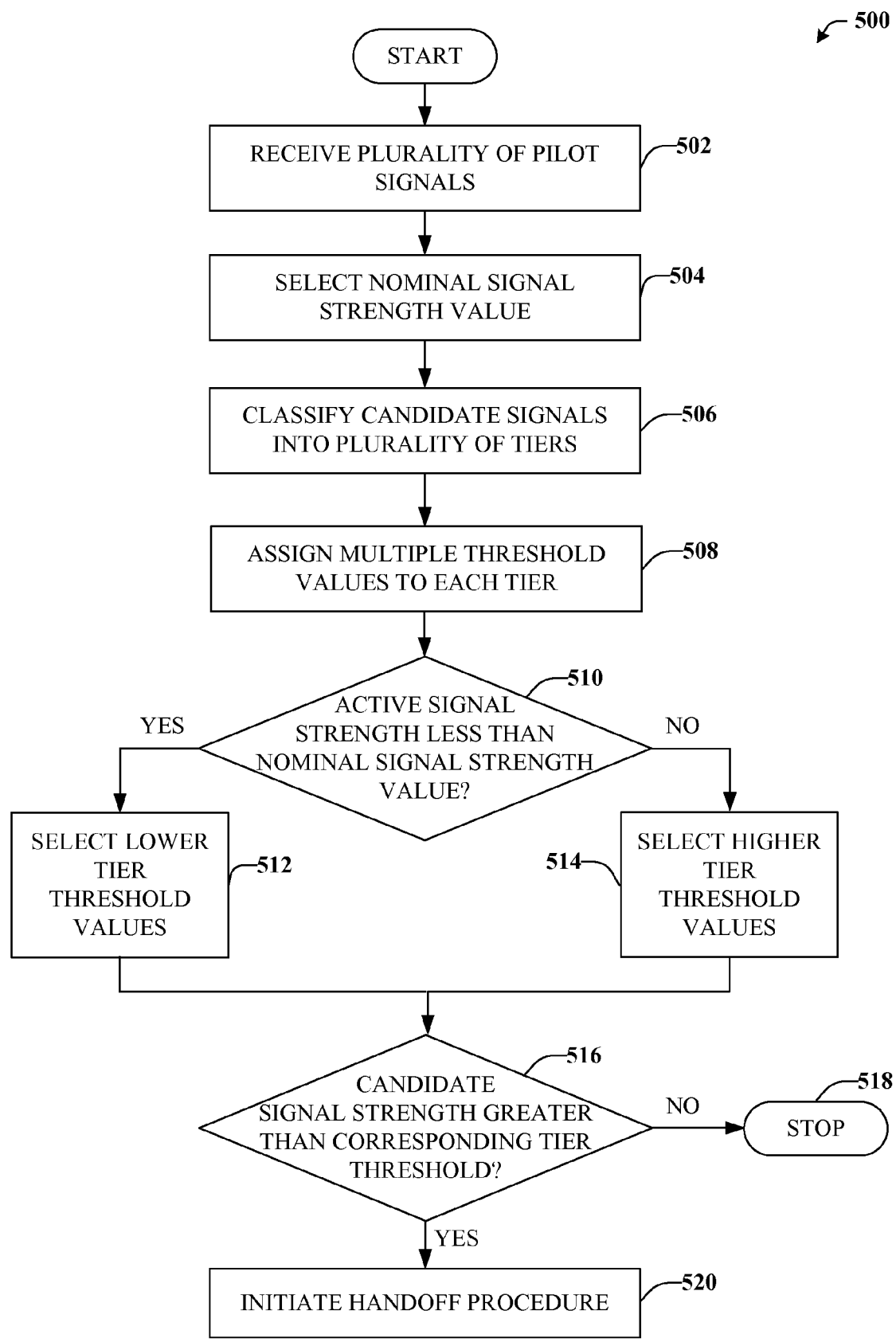
FIG. 5 depicts an exemplary method for facilitating handoff operations in a wireless communication device.

FIG. 5 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 5, exemplary method 500 for facilitating handoff operations in a wireless communication device is illustrated. Generally, at reference numeral 502, a WCD may receive a plurality of pilot signals, as described with reference to FIG. 2. In one aspect, the plurality of pilot signals may include an active pilot signal and at least one candidate pilot signal, where the active pilot signal is associated with the active base station and the at least one candidate pilot signal is associated with at least one neighboring base station. Next to be described, at reference numeral 504, a nominal signal strength may be selected. In one aspect, more than one nominal signal strength may be selected where each value depends at least in part of whether the candidate base station is within the same subnet as the active base station. For example, a nominal signal value of −7 dB may be used in comparisons with candidate signals within the same subnet as the active base station, while a nominal signal value of −9 dB may be used in comparisons with candidate signals not within the same subnet as the active base station. As such, a preference may be shown for facilitating a handoff within a subnet over facilitating a handoff between subnets. In one aspect, an adaptive filter may be used to filter the received active signal value such that short term pilot signal variations are removed or at least reduced. For example, an infinite impulse response (IIR) filter may be used to generate a hysteresis based threshold with filter coefficients adaptively selected at least partially based on the pilot signal sampling rate.

At reference numeral 506, candidate pilot signals may be classified into a plurality of tiers. In one aspect, the plurality of tiers may organized into three tiers, with a first tier to accept candidate pilot signals that have overhead information associated with the candidate pilot signal stored with the wireless device and the same subnet as the active pilot signal, a second tier to accept candidate pilot signals that do not have overhead information associated with the candidate pilot signal stored with the wireless device but are part of the same subnet as the active pilot signal, and a third tier to accept candidate pilot signals that are not part of the same subnet as the active pilot signal.

At reference numeral 508, multiple threshold values may be applied to each of the plurality of tiers. In one aspect, a first set of thresholds may be applied if it is determined that the active signal strength is less than the nominal signal value and a second set of thresholds may be applied if it is determined that the active signal strength is greater than or equal to the nominal signal value. As such, a preference may be shown for more easily facilitating handoff when the current signal is weaker than when the current pilot signal is stronger than a nominal signal value. For example, with respect to the first tier referenced above, a threshold value requiring the candidate signal to be at least 3 dB greater than the active signal may be applied when a active signal is greater than or equal to the applicable nominal signal value while a threshold value requiring the candidate signal to be at least 2 dB greater than the active signal may be applied when a active signal is less than the applicable nominal signal value. Further, for example, with respect to the second tier referenced above, a threshold value requiring the candidate signal to be at least 4 dB greater than the active signal may be applied when a active signal is greater than or equal to the applicable nominal signal value while a threshold value requiring the candidate signal to be at least 2 dB greater than the active signal may be applied when a active signal is less than the applicable nominal signal value. Still further, for example, with respect to the third tier referenced above, a threshold value requiring the candidate signal to be at least 5 dB greater than the active signal may be applied when a active signal is greater than or equal to the applicable nominal signal value while a threshold value requiring the candidate signal to be at least 3 dB greater than the active signal may be applied when a active signal is less than the applicable nominal signal value.

At reference numeral 510, it is determined whether the active signal strength is less than the applicable nominal signal value. As discussed above, multiple nominal signal values may be generated depending on whether the candidate signal is within the same subnet as the active signal or not. If at reference numeral 510 it is determined that the active signal strength is less than the applicable nominal signal value, then at reference numeral 512 lower tier threshold values are selected. By contrast, if at reference numeral 510 it is determined that the active signal strength is greater than or equal to the applicable nominal signal value, then at reference numeral 514 higher tier threshold values are selected. As such, preference may be shown to handoff to candidate signals with the same subnet as the active pilot signal and further to show a preference for only handing off when the active signal is relatively weak.

At reference numeral 516, it is determined whether any candidate signals from any of the plurality of tiers meet the applicable threshold. If it is determined that no candidate signals meet the applicable threshold, then at reference numeral 518 the process stops. By contrast, if it is determined that a candidate signals meets the applicable threshold, then at reference numeral 520 a handoff procedure is initiated to handoff to the base station associated with the selected candidate signal. In one aspect, if more than one candidate pilot signal strength from the multiple tiers exceeds the corresponding threshold handoff value, then a determination as to whether the more than one candidate pilot signals are within the same subnet as the active pilot signal may be made. If the more than one candidate pilot signals are within the same subnet as the active pilot signal, then the candidate pilot signal with the greatest signal strength may be selected and at reference numeral 520 a handoff procedure is initiated to handoff to the base station associated with the selected candidate signal. If the more than one candidate pilot signals are not within the same subnet as the active pilot signal, then the candidate pilot signal that is within the same subnet as the active pilot signal may be selected if present, and if not, then the candidate pilot signal with the greatest signal strength may be selected and at reference numeral 520 a handoff procedure is initiated to handoff to the base station associated with the selected candidate signal.

Figure 6:
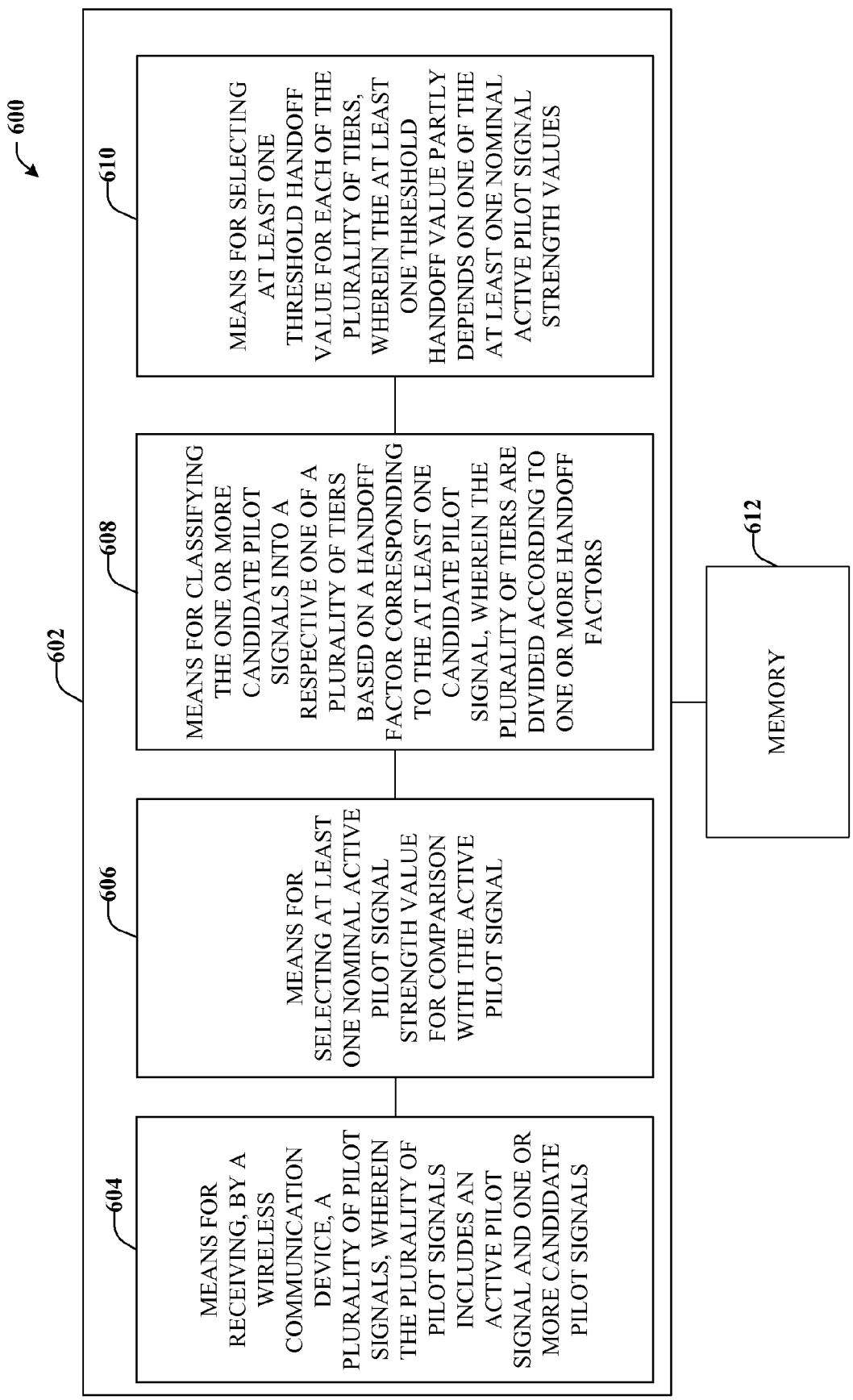
FIG. 6 depicts a block diagram of an exemplary communication system that can facilitate handoff operations in a wireless communication device.

With reference to FIG. 6, illustrated is a system 600 that facilitates handoff operations in a wireless communication device. For example, system 600 can reside at least partially within a base station, mobile device, etc. According to another example aspect, system 600 can reside at least partially within an access terminal. It is to be appreciated that system 600 is represented as including functional blocks, which can be functional blocks that represent functions implemented by a processor, software, or combination thereof (e.g., firmware).

System 600 includes a logical grouping 602 of means that can act in conjunction. For instance, logical grouping 602 can include means for receiving, by a wireless communication device, a plurality of pilot signals, wherein the plurality of pilot signals includes an active pilot signal and one or more candidate pilot signals 604. For example, a wireless device may receive an active pilot signal and a list of possible neighboring base stations with their corresponding pilot signals, strengths, subnet affiliations, etc. Further, logical grouping 602 can include means for selecting at least one nominal active pilot signal strength value for comparison with the active pilot signal 606. In one aspect, an adaptive filter may be used to filter the received active signal value such that short term pilot signal variations are removed or at least reduced. For example, an infinite impulse response (IIR) filter may be used to generate a hysteresis based threshold with filter coefficients adaptively selected at least partially based on the pilot signal sampling rate.

Further, logical grouping 602 can comprise means for classifying the one or more candidate pilot signals into a respective one of a plurality of tiers based on a handoff factor corresponding to the at least one candidate pilot signal, wherein the plurality of tiers are divided according to one or more handoff factors 608. In one aspect, the plurality of tiers may be organized into three tiers, with handoff factors relating to overhead information and subnet information. In such an aspect, a first tier may accept candidate pilot signals that have overhead information associated with the candidate pilot signal stored with the wireless device and the same subnet as the active pilot signal, a second tier may accept candidate pilot signals that do not have overhead information associated with the candidate pilot signal stored with the wireless device but are part of the same subnet as the active pilot signal, and a third tier may accept candidate pilot signals that are not part of the same subnet as the active pilot signal.

Additionally, logical grouping 602 can comprise means for selecting at least one threshold handoff value for each of the plurality of tiers, wherein the at least one threshold handoff value partly depends on one of the at least one nominal active pilot signal strength values 610. In one aspect, a nominal active pilot signal strength value may include a first value to use with a candidate pilot signal associated with a base station within the same subnet as the active pilot signal and a second value to use with a candidate pilot signal associated with a base station not within the same subnet as the active pilot signal. In such an aspect, the nominal active pilot signal strength value selected for a pilot signal not associated with a base station within the same subnet is higher than a nominal active pilot signal strength value for a pilot signal associated with a base station within the same subnet.

Based at least in part on this information, an effective means of facilitating handoff can be inferred. Additionally, system 600 can include a memory 612 that retains instructions for executing functions associated with the means 604, 606, 608 and 610. While shown as being external to memory 612, it is to be understood that one or more of the means 604, 606, 608 and 610 can exist within memory 612.

Figure 7:
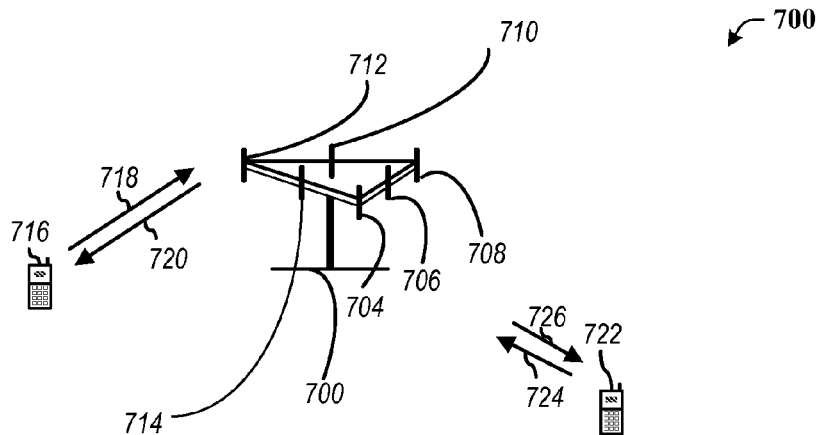
FIG. 7 illustrates an exemplary multiple access wireless communication system according to an aspect.

Referring to FIG. 7, a multiple access wireless communication system according to one aspect is illustrated. An access point 700 (AP) includes multiple antenna groups, one including 704 and 706, another including 708 and 710, and an additional including 712 and 714. In FIG. 7, only two antennas are shown for each antenna group, however, more or fewer antennas may be utilized for each antenna group. Access terminal 716 (AT) is in communication with antennas 712 and 714, where antennas 712 and 714 transmit information to access terminal 716 over forward link 720 and receive information from access terminal 716 over reverse link 718. Access terminal 722 is in communication with antennas 706 and 708, where antennas 706 and 708 transmit information to access terminal 722 over forward link 726 and receive information from access terminal 722 over reverse link 724. In a FDD system, communication links 718, 720, 724 and 726 may use different frequency for communication. For example, forward link 720 may use a different frequency then that used by reverse link 718.

Each group of antennas and/or the area in which they are designed to communicate is often referred to as a sector of the access point. In the aspect, antenna groups each are designed to communicate to access terminals in a sector, of the areas covered by access point 700.

In communication over forward links 720 and 726, the transmitting antennas of access point 700 utilize beamforming in order to improve the signal-to-noise ratio of forward links for the different access terminals 716 and 724. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 8:
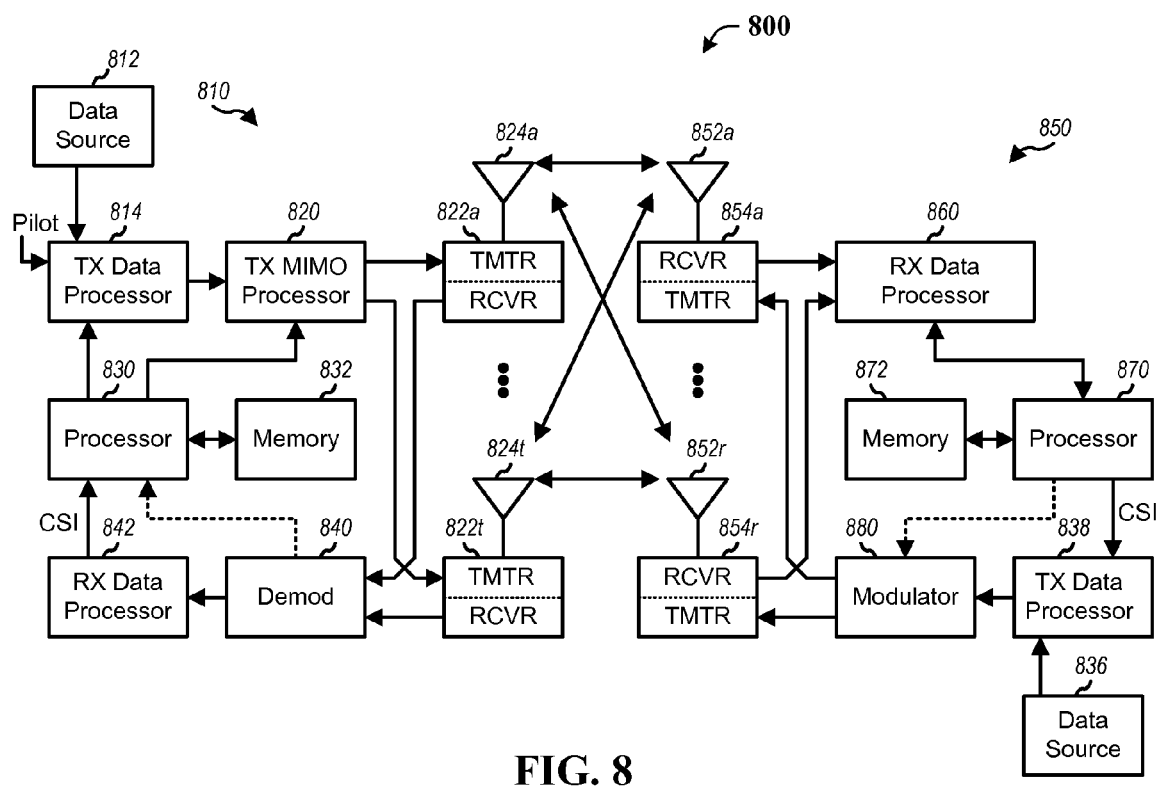
FIG. 8 depicts a block diagram of an exemplary communication system.

Referring to FIG. 8, a block diagram of an aspect of a transmitter system 810 (also known as the access point) and a receiver system 850 (also known as access terminal) in a MIMO system 800 is illustrated. At the transmitter system 810, traffic data for a number of data streams is provided from a data source 812 to a transmit (TX) data processor 814.

In an aspect, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for all data streams are then provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In certain aspects, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use (discussed below). Processor 870 formulates a reverse link message comprising a matrix index portion and a rank value portion.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Processor 830 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels may comprise:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)
  The UL PHY Channels comprises:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations may apply:
AM Acknowledged Mode
AMD Acknowledged Mode Data
ARQ Automatic Repeat Request
BCCH Broadcast Control Channel
BCH Broadcast Channel
C— Control—
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL DownLink
DSCH Downlink Shared Channel
DTCH Dedicated Traffic Channel
FACH Forward link Access Channel
FDD Frequency Division Duplex
L1 Layer 1 (physical layer)
L2 Layer 4 (data link layer)
L3 Layer 4 (network layer)
LI Length Indicator
LSB Least Significant Bit
MAC Medium Access Control
MBMS Multimedia Broadcast Multicast Service
MCCH MBMS point-to-multipoint Control Channel
MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging CHannel
PDU Protocol Data Unit
PHY Physical layer
PhyCH Physical Channels
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Further, for example, the present aspects may be applied to a Long Term Evolution (LTE) system, including components such as: an Evolved NodeB (E-NodeB), which has base station functionality; an Evolved UMTS Terrestrial Radio Access Network (E-UTRAN), which is the network that includes the E-NodeBs; and an Evolved Packet Core (EPC), also known as a System Architecture Evolution (SAE) core, which serves as the equivalent of GPRS networks via the Mobility Management Entity (MME), Serving Gateway (S-GW) and Packet Data Node (PDN) Gateway sub components.

The MME is a control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 4G/3G access networks with the S3 interface terminating at the MME from the SGSN. The MME also terminates the S6a interface towards the home HSS for roaming UEs.

The SGW routes and forwards user data packets, while also acting as the mobility anchor for the user plane during inter-E-NodeB handovers and as the anchor for mobility between LTE and other 4GPP technologies (terminating S4 interface and relaying the traffic between 4G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The PDN GW provides connectivity to the UE to external packet data networks by being the point of exit and entry of traffic for the UE. A UE may have simultaneous connectivity with more than one PDN GW for accessing multiple PDNs. The PDN GW performs policy enforcement, packet filtering for each user, charging support, lawful Interception and packet screening. Another role of the PDN GW is to act as the anchor for mobility between 4GPP and non-3GPP technologies such as WiMAX and 4GPP2 (CDMA 1X and EvDO).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 4GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for facilitating handoff operations in a wireless communication device, the method comprising:
    receiving, by a wireless communication device, a plurality of pilot signals, wherein the plurality of pilot signals includes an active pilot signal corresponding to an active base station serving the device and one or more candidate pilot signals corresponding to one or more candidate base stations for receiving a handoff for serving the device;
    selecting at least one nominal active pilot signal strength value for comparison with the active pilot signal;
    classifying the one or more candidate pilot signals into a respective one of a plurality of tiers based on a handoff factor corresponding to the at least one candidate pilot signal, wherein the plurality of tiers are divided according to one or more handoff factors; and
    selecting at least one threshold handoff value for each of the plurality of tiers for use in determining whether to handoff the call, wherein the at least one threshold handoff value depends on one of the at least one nominal active pilot signal strength values.

2. The method of claim 1, further comprising:
    determining if one or more candidate pilot signal strengths exceeds the corresponding threshold handoff value; and
    upon a determination that one or more candidate pilot signal strengths exceeds the corresponding threshold handoff value, initiating a handoff procedure to handoff the call.

3. The method of claim 1, further comprising applying an adaptive filter to the received plurality of pilot signals, wherein the adaptive filter substantially removes short term pilot signal variations.

4. The method of claim 1, wherein the at least one nominal active pilot signal strength value includes a first value to use with a candidate pilot signal within the same subnet as the active pilot signal and a second value to use with a candidate pilot signal within a different subnet than the active pilot signal, wherein the second value is a higher threshold value than the first value.

5. The method of claim 1, wherein the classifying based on one or more handoff factors further comprises at least one of:
    determining if overhead information associated with a candidate pilot signal is stored with the wireless communication device; or
    determining if a candidate pilot signal is associated with the same subnet as the active pilot signal.

6. The method of claim 5, wherein the classifying further comprises:
    classifying in a first tier any candidate pilot signals that have overhead information stored with the wireless device and that are within the same subnet as the active pilot signal,
    classifying in a second tier any candidate pilot signals that do not have overhead information stored with the wireless device and that are within the same subnet as the active pilot signal, and
    classifying in a third tier any candidate pilot signals that are not within the same subnet as the active pilot signal.

7. The method of claim 6, wherein the at least one threshold handoff value for the first tier is a smaller value than the at least one threshold handoff value for the second tier, wherein the at least one threshold handoff value for the second tier is a smaller value than the at least one threshold handoff value for the third tier, and wherein a handoff procedure may be initiated more easily when a smaller value is used.

8. The method of claim 1, wherein the at least one threshold handoff value includes a first value and a second value, further comprising using the first value when the active pilot signal strength is greater than or equal to one of the at least one nominal active pilot signal strength values, and using the second value when the active pilot signal strength is less than one of the at least one nominal active pilot signal strength values.

9. The method of claim 8, wherein the at least one nominal active pilot signal strength value includes a first nominal value and a second nominal value, further comprising using the first nominal value with a candidate pilot signal within the same subnet as the active pilot signal, and using the second nominal value with a candidate pilot signal not within the same subnet as the active pilot signal, wherein the second nominal value is a higher threshold nominal value than the first nominal value.

10. The method of claim 2, further comprising
    upon a determination that more than one candidate pilot signal strength exceeds the corresponding threshold handoff value, determining if the more than one candidate pilot signals are within the same subnet as the active pilot signal; and
    upon a determination that all of the more than one candidate pilot signals are within the same subnet as the active pilot signal, selecting the candidate pilot signal having a greatest signal strength.

11. The method of claim 2, further comprising
    upon a determination that more than one candidate pilot signal strength exceeds the corresponding threshold handoff value, determining if the more than one candidate pilot signals are within the same subnet as the active pilot signal; and
    upon a determination that at least one of the more than one candidate pilot signals is not within the same subnet as the active pilot signal, selecting the candidate pilot signal having a greatest signal strength that is within the same subnet as the active pilot signal if any are present, and if no candidate pilot signals are present within the same subnet then selecting the candidate pilot signal having the greatest signal strength.

12. The method of claim 1, wherein the receiving is performed while the wireless communication device is in an idle state.

13. The method of claim 1, further comprising:
    storing, by the wireless communications device, overhead information for at least one cell, wherein each cell is associated with at least one pilot signal, and wherein the stored overhead information is time stamped to upon receipt;

obtaining, by the wireless communications device, additional overhead information, wherein the additional obtained overhead information is time stamped to classify when the overhead information was obtained;

determining if the wireless communications device is able to store the additional obtained overhead information;

upon a determination that the wireless communications device is unable to store the additional obtained overhead information, removing at least one stored overhead information; and storing the additional obtained overhead information.

14. The method of claim 13, wherein the removing further comprises removing at least one of the at least one stored overhead information based on the oldest time stamp for the stored overhead information.

15. The method of claim 13, wherein the active base station serving the device corresponds to a serving cell, and wherein the removing further comprises removing the at least one stored overhead information based on the oldest time stamp for the stored overhead information that is not associated with a neighbor cell in a neighbor list of the serving cell.

16. A processor for facilitating handoff operations in a wireless communication device, comprising:

a first module for receiving, by a wireless communication device, a plurality of pilot signals, wherein the plurality of pilot signals includes an active pilot signal and one or more candidate pilot signals;

a second module for selecting at least one nominal active pilot signal strength value for comparison with the active pilot signal;

a third module for classifying the one or more candidate pilot signals into a respective one of a plurality of tiers based on a handoff factor corresponding to the at least one candidate pilot signal, wherein the plurality of tiers are divided according to one or more handoff factors; and a fourth module for selecting at least one threshold handoff value for each of the plurality of tiers, wherein the at least one threshold handoff value partly depends on one of the at least one nominal active pilot signal strength values.

17. A program recorded on a computer readable medium and executable on a computer, comprising the steps of:

receiving, by a wireless communication device, a plurality of pilot signals, wherein the plurality of pilot signals includes an active pilot signal and one or more candidate pilot signals;

selecting at least one nominal active pilot signal strength value for comparison with the active pilot signal;

classifying the one or more candidate pilot signals into a respective one of a plurality of tiers based on a handoff factor corresponding to the at least one candidate pilot signal, wherein the plurality of tiers are divided according to one or more handoff factors; and selecting at least one threshold handoff value for each of the plurality of tiers, wherein the at least one threshold handoff value partly depends on one of the at least one nominal active pilot signal strength values.

18. An apparatus, comprising:

means for receiving, by a wireless communication device, a plurality of pilot signals, wherein the plurality of pilot signals includes an active pilot signal and one or more candidate pilot signals;

means for selecting at least one nominal active pilot signal strength value for comparison with the active pilot signal;

means for classifying the one or more candidate pilot signals into a respective one of a plurality of tiers based on a handoff factor corresponding to the at least one candidate pilot signal, wherein the plurality of tiers are divided according to one or more handoff factors; and means for selecting at least one threshold handoff value for each of the plurality of tiers, wherein the at least one threshold handoff value partly depends on one of the at least one nominal active pilot signal strength values.

19. An apparatus, comprising:

a receiver operable for receiving, by a wireless communication device, a plurality of pilot signals, wherein the plurality of pilot signals includes an active pilot signal and one or more candidate pilot signals;

a cell reselection module operable for:

selecting at least one nominal active pilot signal strength value for comparison with the active pilot signal;

classifying the one or more candidate pilot signals into a respective one of a plurality of tiers based on a handoff factor corresponding to the at least one candidate pilot signal, wherein the plurality of tiers are divided according to one or more handoff factors; and selecting at least one threshold handoff value for each of the plurality of tiers, wherein the at least one threshold handoff value partly depends on one of the at least one nominal active pilot signal strength values.

20. The apparatus of claim 19, wherein the cell reselection module is further operable for determining if one or more candidate pilot signal strengths exceeds the corresponding threshold handoff value; and a handoff module operable for initiating a handoff procedure upon a determination that one or more candidate pilot signal strengths exceeds its corresponding threshold handoff value.

21. The apparatus of claim 19, the cell reselection module is further operable for applying an adaptive filter to the received plurality of pilot signals, wherein the adaptive filter substantially removes short term pilot signal variations.

22. The apparatus of claim 19, wherein the at least one nominal active pilot signal strength value includes a first value to use with a candidate pilot signal within the same subnet as the active pilot signal and a second value to use with a candidate pilot signal within a different subnet than the active pilot signal, wherein the second value is a higher threshold value than the first value.

23. The apparatus of claim 19, wherein the cell reselection module is further operable for at least one of:

determining if overhead information associated with a candidate pilot signal is stored with the wireless communication device; or determining if a candidate pilot signal is associated with the same subnet as the active pilot signal.

24. The apparatus of claim 23, wherein the cell reselection module is further operable for:

classifying in a first tier any candidate pilot signals that have overhead information stored with the wireless device and that are within the same subnet as the active pilot signal, classifying in a second tier any candidate pilot signals that do not have overhead information stored with the wireless device and that are within the same subnet as the active pilot signal, and classifying in a third tier any candidate pilot signals that are not within the same subnet as the active pilot signal.

25. The apparatus of claim 24, wherein the at least one threshold handoff value for the first tier is a smaller value than the at least one threshold handoff value for the second tier, wherein the at least one threshold handoff value for the second tier is a smaller value than the at least one threshold handoff value for the third tier, and wherein a handoff procedure may be initiated more easily when a smaller value is used.

26. The apparatus of claim 19, wherein the at least one threshold handoff value includes a first value and a second value, further comprising using the first value when the active pilot signal strength is greater than or equal to one of the at least one nominal active pilot signal strength values, and using the second value when the active pilot signal strength is less than one of the at least one nominal active pilot signal strength values.

27. The apparatus of claim 19, wherein the at least one nominal active pilot signal strength value includes a first nominal value and a second nominal value, further comprising using the first nominal value with a candidate pilot signal within the same subnet as the active pilot signal, and using the second nominal value with a candidate pilot signal not within the same subnet as the active pilot signal, wherein the second nominal value is a higher threshold nominal value than the first nominal value.

28. The apparatus of claim 20, wherein the cell reselection module is further operable for:
   determining if the more than one candidate pilot signals are within the same subnet as the active pilot signal upon a determination that more than one candidate pilot signal strength exceeds the corresponding threshold handoff value; and
   selecting the candidate pilot signal having a greatest signal strength upon a determination that all of the more than one candidate pilot signals are within the same subnet as the active pilot signal.

29. The apparatus of claim 20, wherein the cell reselection module is further operable for:
   determining if the more than one candidate pilot signals are within the same subnet as the active pilot signal upon a determination that more than one candidate pilot signal strength exceeds the corresponding threshold handoff value; and
   selecting the candidate pilot signal having a greatest signal strength that is within the same subnet as the active pilot signal if any are present, and if no candidate pilot signals are present within the same subnet then selecting the candidate pilot signal having the greatest signal strength upon a determination that at least one of the more than one candidate pilot signals is not within the same subnet as the active pilot signal.

30. The apparatus of claim 19, wherein the receiver is further operable for receiving is performed while the wireless communication device is in an idle state.

31. The apparatus of claim 19, further comprising:
   a storage module operable for:
      storing, by the wireless communications device, overhead information for at least one cell, wherein each cell is associated with at least one pilot signal, and wherein the stored overhead information is time stamped to upon receipt; and
   wherein the cell reselection module is further operable for:
      obtaining, by the wireless communications device, additional overhead information, wherein the additional obtained overhead information is time stamped to classify when the overhead information was obtained;
      determining if the wireless communications device is able to store the additional obtained overhead information;
      upon a determination that the wireless communications device is unable to store the additional obtained overhead information, removing at least one stored overhead information; and
   wherein the storage module is further operable for:
      storing the additional obtained overhead information.

32. The method of claim 31, wherein the cell reselection module is further operable for removing at least one of the at least one stored overhead information based on the oldest time stamp for the stored overhead information.

33. The method of claim 31, wherein the active base station serving the device corresponds to a serving cell, and wherein the cell reselection module is further operable for removing the at least one stored overhead information based on the oldest time stamp for the stored overhead information that is not associated with a neighbor cell in a neighbor list of the serving cell.

* * * * *